March 20, 1956     C. F. KAEGEBEIN     2,738,764
DEMOUNTABLE ENTRANCE PLATFORM LAYING NESTS
Filed Aug. 21, 1952
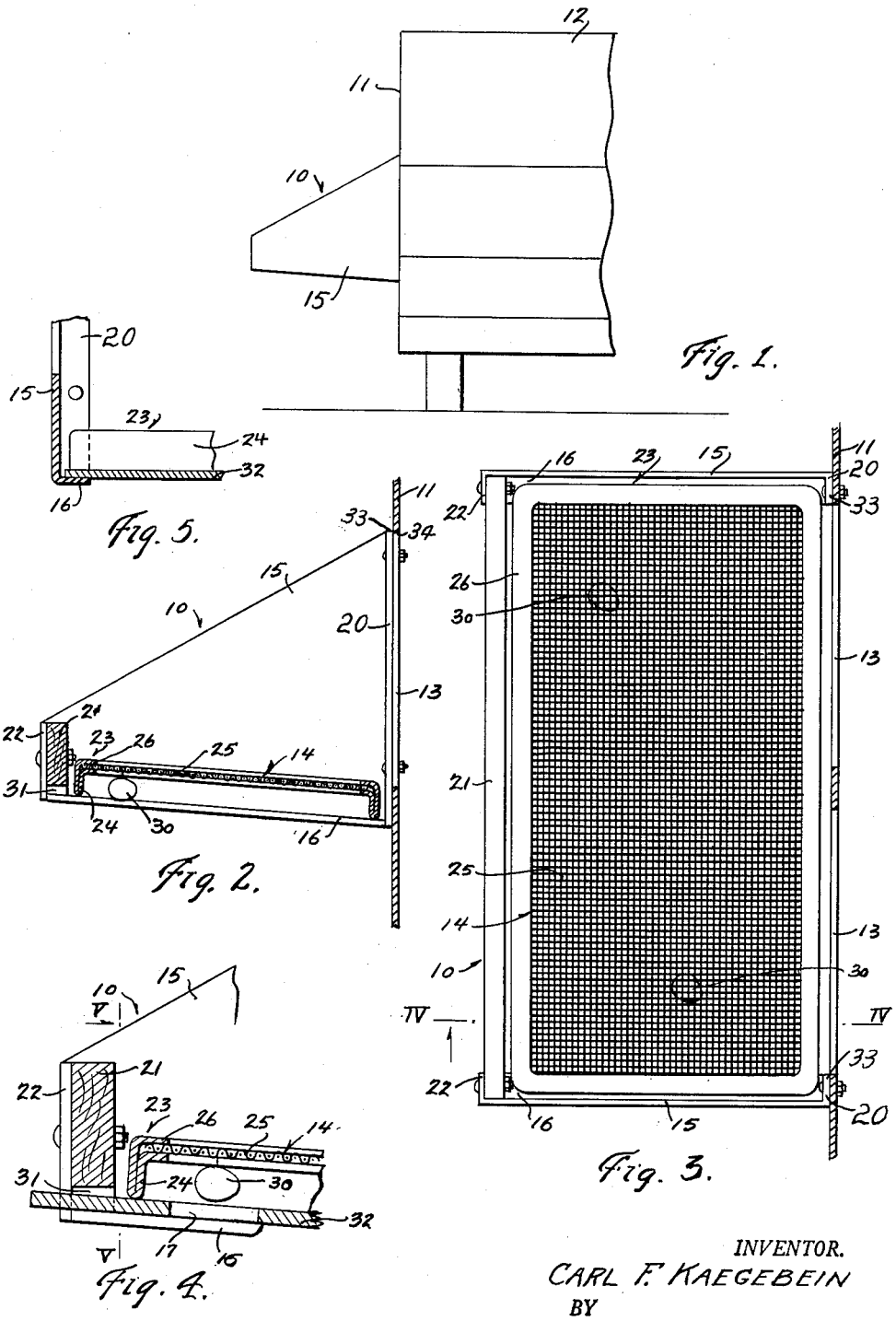
INVENTOR.
CARL F. KAEGEBEIN
BY
Bean, Brooks, Buckley & Bean.
ATTORNEYS

United States Patent Office 2,738,764
Patented Mar. 20, 1956

2,738,764
DEMOUNTABLE ENTRANCE PLATFORM FOR LAYING NESTS

Carl F. Kaegebein, Grand Island, N. Y.

Application August 21, 1952, Serial No. 305,616

2 Claims. (Cl. 119—45)

My invention relates in general to laying nests, and in particular to training platforms located at the entrance openings thereof.

The principal object of my invention is to provide a platform for use with any type of laying nest which will train hens to lay in a prescribed place and to act as an inducement for the poultry to use the laying nest.

Another object has been to provide a device where a hen may lay her eggs in open view to encourage other hens to also lay.

A further object is to provide a device of this nature having a laying platform inclined toward the nest whereby eggs laid thereon will roll into the nest proper.

A further object is to provide a platform with which litter may be employed if desired as indicated by the habits of the poultry.

Moreover my invention provides means whereby artificial eggs may be displayed in such a manner as to attract and interest the poultry.

The above objects and advantages have been accomplished by the device shown in the accompanying drawings, of which:

Fig. 1 is a side view of my invention attached to a poultry nest;
Fig. 2 is an enlarged side sectional view of the device;
Fig. 3 is a plan view thereof;
Fig. 4 is an enlarged sectional view taken on line IV—IV of Fig. 3 showing the use of a litter board; and,
Fig. 5 is an enlarged fragmentary sectional view taken on line V—V of Fig. 3.

My device may be used in connection with any of the various types of laying nests; and, for convenience of illustration I have shown the device, represented by the numeral 10, attached to the front wall 11 of a conventional laying nest 12. As shown in Fig. 3, the device is attached by any suitable means to the wall 11 of the nest and is positioned opposite the entrance opening 13 thereof.

Since it is a well-known fact that hens are more or less temperamental and sometimes have an aversion to enter a confined area for laying their eggs, I have provided an open laying area in front of the entrance opening of the nest which will eventually train such hens to use the nest. To this end the invention comprises a laying floor 14 which extends outwardly away from the entrance opening 13 of the nest where hens may lay their eggs and from which position they may later be induced to enter the laying nest. The device is provided with two spaced side plates 15, one arranged at each side of the device and each having a bottom flange 16 upon which the floor 14 rests. Each of the side plates is formed with a rear vertical flange 20 whereby the device may be secured to the front wall 11 of the nest. The upper end 33 of the rear edge of each of said walls extends up to the upper edge 34 of the opening 13. A perch 21 extends across the front edge of the device and it is held in place by means of end flanges 22 formed on the forward ends of the side plates. As clearly shown in the drawings, the side plates have their upper edges arranged at an angle to and inclined downwardly from the face of the entrance wall 11 to the porch 21. These walls, therefore, enclose the device and form a stall for the hen when she is upon the floor 14. The bottom flanges 16 are slightly inclined downwardly toward the front wall 11 of the nest, whereby eggs deposited upon the floor will roll backwardly toward and through the openings into the nest.

The floor 14 comprises a screen frame 23 of angular cross section made preferably of sheet metal and formed with a downwardly extending leg 24 for supporting the screen 25 in spaced relation with the bottom of the device. The flange which is rectangular in shape is also formed with a horizontal leg 26 between which the edges of the screen 25 are securely fastened. The floor may, of course, be permanently fastened in place, but it is preferable to make it removable. In order to encourage the hens to light upon the floor and to lay eggs thereupon, a number of artificial eggs 30 may be supported underneath the screen where they will be visible to hens either underneath or on top of the platform.

As shown in Figs. 2 and 4 the perch 21 does not extend down to the flanges 16, but a space 31 is provided at the bottom edge thereof for passage of a screen litter board 32 shown in Fig. 4. As is well known to poultry men, some hens lay more eggs when litter is provided, and the litter board is used initially to train the birds to lay thereupon. As shown in Fig. 4 this board is disposed beneath the screen frame 23 of the floor and the board and frame will be supported by the wall flanges 16. When decoy eggs are to be used the litter board is formed with an opening 17 directly beneath each egg.

When my device is attached to the entrance opening of a laying nest, the hens must first light upon the perch or laying floor before entering the nest. Due largely to the construction of the platform, the provision of the litter board and the presence of the decoy eggs, the hens are encouraged to lay their eggs upon the floor of the platform, and other hens seeing the birds in the open nest of the platform are encouraged to also light upon the floor, but since the platform cannot accommodate all the birds which desire to occupy it, some of them are forced to go into the laying nest. After the birds have used the platform a reasonable length of time, the litter board is removed and the floor or ground beneath the platform is thus exposed to view. Since hens prefer not to lay their eggs upon an open mesh floor, they will enter the laying nest from the platform and will lay their eggs upon the floor of the nest.

What I claim is:

1. The combination with a poultry laying nest formed with an entrance opening, of a demountable entrance platform disposed in front of the entrance opening and adapted to be used by a hen in laying her eggs, said platform comprising two spaced side plates each extending along one edge of said platform from the front to the rear thereof and having the upper edge thereof inclined upwardly toward the upper boundary of the entrance opening thereby forming end walls for the platform, each plate having an inwardly extending flange along the lower edge thereof and inclined downwardly toward the entrance opening, a perch extending across the platform and having the ends thereof secured to the forward edge of each of said plates, a wire mesh laying floor formed with downwardly extending flanges supported by the inwardly extending flanges of said plates, and means for securing said platform in place upon the nest.

2. The combination with a poultry laying nest formed with an entrance opening, of a demountable entrance platform disposed in front of the entrance opening and adapted to be used by a hen in laying her eggs, said platform comprising two spaced side plates each extending along one edge of said platform from the front to the rear thereof and having the upper end of the rear edge thereof terminating at the upper boundary of the entrance opening thereby forming end walls for the platform, each plate having an inwardly extending bottom flange along the lower edge thereof, a perch extending across said platform and having its ends secured to the forward edges of said plates, the lower edge of said perch being spaced vertically above said bottom flanges, a removable litter board extending across from one plate to the other and supported by said flanges, a wire mesh laying floor substantially coextensive with and supported by and upon said board, and means for securing said platform in place upon the nest.

References Cited in the file of this patent

UNITED STATES PATENTS

| | | |
|---|---|---|
| 1,192,196 | Hebert | July 25, 1916 |
| 1,257,796 | Brooks | Feb. 26, 1918 |
| 1,288,325 | Weldon | Dec. 17, 1918 |
| 1,402,790 | Olson | Jan. 10, 1922 |
| 2,515,063 | Stanchfield | July 11, 1950 |
| 2,531,584 | Peterson | Nov. 28, 1950 |